United States Patent [19]
Holter

[11] Patent Number: 5,427,427
[45] Date of Patent: Jun. 27, 1995

[54] AUXILIARY VISOR FOR MOTOR VEHICLES

[76] Inventor: John W. Holter, 10619 Valley Forge Cir., King of Prussia, Pa. 19405

[21] Appl. No.: 299,916

[22] Filed: Sep. 1, 1994

[51] Int. Cl.⁶ .............................................. B60J 3/02
[52] U.S. Cl. .................................. 296/97.6; 296/97.9
[58] Field of Search ................... 296/97.6, 97.9, 97.8

[56] References Cited

U.S. PATENT DOCUMENTS

| | | | |
|---|---|---|---|
| 1,421,467 | 7/1922 | Harden | 296/97.9 X |
| 2,101,901 | 12/1937 | Fletcher | 296/97.8 X |
| 2,446,866 | 8/1948 | Bell | 296/97.9 X |
| 2,812,209 | 11/1957 | Sidlo . | |
| 2,833,591 | 5/1958 | Kurtzke . | |
| 3,853,370 | 12/1974 | Barnhart . | |
| 3,961,820 | 6/1976 | Spangler | 296/97.6 |
| 4,090,732 | 5/1978 | Vistitsky | 296/97.8 |
| 4,090,733 | 5/1978 | Altschul | 296/97.6 |
| 4,690,451 | 9/1987 | Killar . | |
| 4,792,176 | 12/1988 | Karford | 296/97.8 |
| 4,982,992 | 1/1991 | Vu et al. | 296/97.6 |

Primary Examiner—Joseph D. Pape
Attorney, Agent, or Firm—Synnestvedt & Lechner

[57] ABSTRACT

An auxiliary sun or glare shield in the form of a tinted transparent sheet is provided along with an arrangement for demountably attaching the sheet to and positioning the sheet with respect to a vehicle visor. A bracket having an inverted J shape is slid over the pivot edge of a vehicle visor and is held in position by an adjustable strap. A pair of parallel arms are pivotally mounted to the bracket and support the sheet at their lower ends by compound hinge assemblies which permit the sheet to be rotated about a horizontal axis parallel to its top edge and/or to be swung by movement of the arms to achieve the desired position. The sheet folds parallel to the vehicle visor for storage.

11 Claims, 2 Drawing Sheets

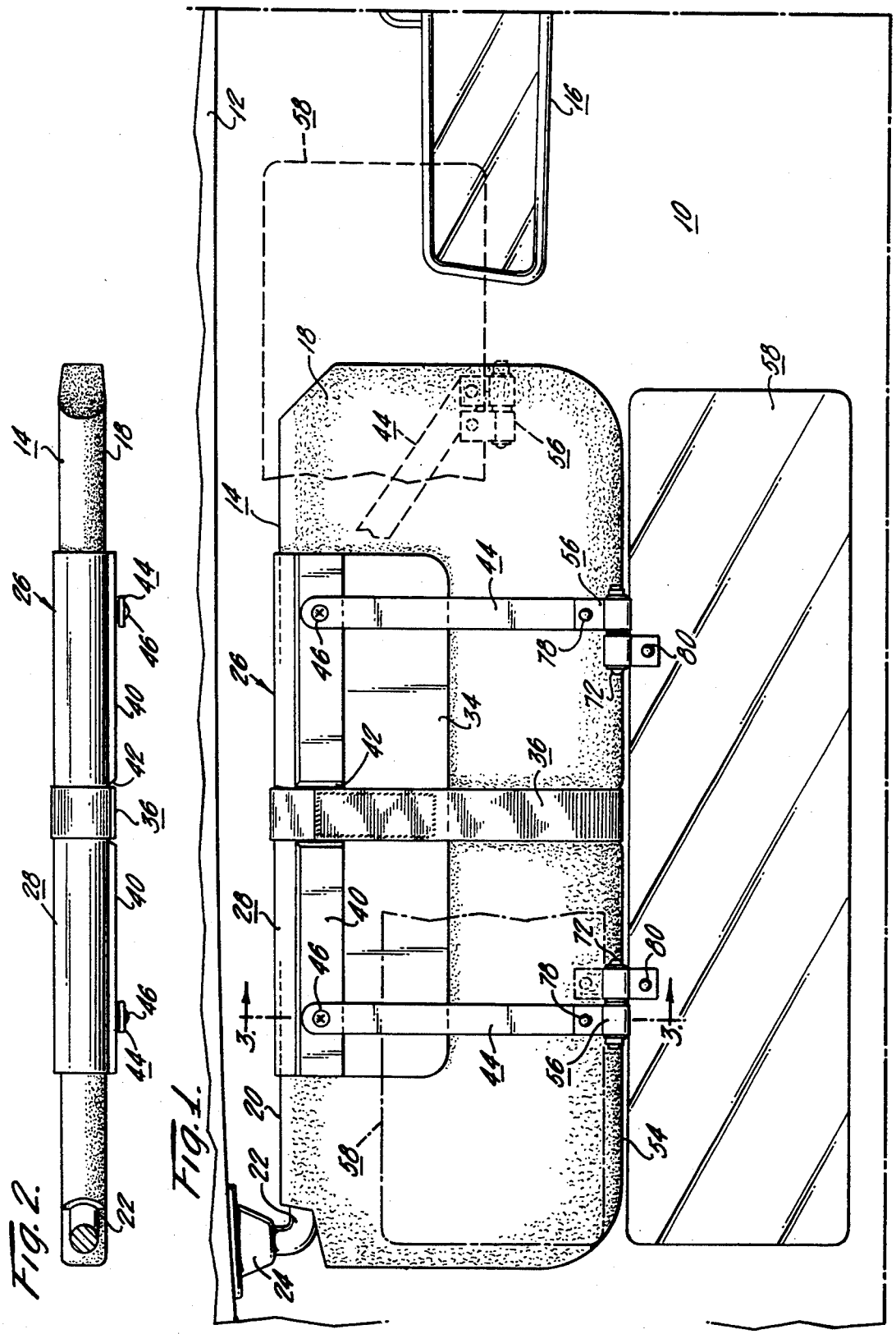

AUXILIARY VISOR FOR MOTOR VEHICLES

BACKGROUND OF THE INVENTION

The present invention relates generally to light filtering devices and relates more particularly to an attachment for motor vehicle visors which includes a tinted sheet for reducing sun glare and mounting means for attaching and positioning the sheet on a vehicle visor.

Driving a motor vehicle toward the sun, particularly during the periods just after sunrise or just before sunset, can greatly reduce a driver's view of the road. The deployment of the vehicle visor can in most instances provide some relief, but in many situations it may be inadequate. For example, the vehicle visor will usually not extend into the center region of the windshield due to the interfering presence of the rear view mirror. Also the vehicle visor usually does not extend downwardly far enough to cut off sun glare reflecting from the road surface. If the visor does extend downwardly enough for this purpose, it may block the view of the road ahead, due to its opaque nature.

In view of the above and other shortcomings of the conventional vehicle visor, the desirability of an auxiliary visor selectively extendable from the vehicle visor and employing a transparent tinted sheet has been recognized, and a number of attempts have been made to provide an effective auxiliary visor of this type. Although some of these attempts have provided an adequate device for selectively extending the auxiliary visor either below the vehicle visor or to the side of the vehicle visor, none until the present invention have provided an auxiliary visor which can be selectively set either below or to the side of the vehicle visor or at any desired intermediate position, and which can be quickly pivoted into a storage position flush with the vehicle visor.

One type of prior art device includes a sliding auxiliary visor as illustrated for example in U.S. Pat. Nos. 3,853,370, 4,690,451 and 4,792,176. In such devices, guide means are provided which permit vertical or horizontal movement of the auxiliary visor, but there is no provision for extending the visor into the regions adjacent the car visor corners. Furthermore, in slide type devices the motion of the car tends to dislodge the auxiliary visor from its desired position.

In another type of device, the auxiliary visor is supported on a single arm, as shown for example in U.S. Pat. Nos. 2,812,209 and 4,090,733. It is difficult to mount such a device so that it can easily be swung to the desired position and so that it will remain rigidly fixed in that position despite the motions of the vehicle.

In still another design, as shown for example in U.S. Pat. No. 4,982,992, the auxiliary visor is pivotally connected to the car visor for rotation about a horizontal axis and is further provided with a slide and a ball pivot to aid in positioning. However, this patent does not address the problem of how to hold the auxiliary visor in a selected position.

Finally, U.S. Pat. Nos. 2,833,591 and 3,961,820 show auxiliary visors wherein the position of the auxiliary visor is changed by adjusting the position of the auxiliary visor mounting means on the car visor as well as by pivotal movement of the auxiliary visor. This would be cumbersome and difficult to do with one hand while driving.

SUMMARY OF THE INVENTION

The present invention comprises a bracket preferably formed as a metal or plastic extrusion and having an inverted J shape so as to fit over the edge of a vehicle visor. An adjustable retaining strap is provided to loop around the vehicle visor and secure the bracket to the vehicle visor at the desired horizontal location. A pair of arms are each pivotally attached to the bracket at horizontally spaced points. The lower ends of the arms are pivotally attached at horizontally spaced points to an edge of a tinted transparent sheet so that the arms are in parallel relation, permitting the arms and the attached sheet to be swung as desired in a plane parallel to the plane of the vehicle visor. Additional pivot means are provided on the ends of the arms to permit the sheet to be swung about a horizontal axis adjacent the sheet edge to which the arms are attached. The sheet may thus be rotated downwardly to form an extension of the vehicle visor, and when no longer needed, swung upwardly into a storage position adjacent the vehicle visor. Optionally, the auxiliary visor can be deployed to the side of the vehicle visor by swinging the arms so as to position the sheet where needed. Spring washers are provided at each pivot point so that the auxiliary visor will remain where positioned.

It is accordingly an object of the present invention to provide an auxiliary visor for a vehicle which can be quickly deployed to provide glare protection for the vehicle occupant in those areas not covered by the vehicle visor, including the areas below, at the sides of or adjacent the corners of the vehicle visor.

It is a further object of the invention to provide an auxiliary visor as described which can be quickly attached to or removed from a vehicle visor and which will not in any way interfere with the normal function of the vehicle visor.

An additional object of the invention is to provide an auxiliary visor as described which can readily be transferred from one vehicle to another and which may be used on either side or both sides of the vehicle.

Another object of the invention is to provide an auxiliary visor as described which can be quickly positioned with one hand and which will remain in the selected position.

A still further object of the invention is to provide an auxiliary visor as described which folds flat against the vehicle visor for storage.

Additional objects and advantages of the invention will be evident from the following detailed description of an embodiment thereof.

BRIEF DESCRIPTION OF THE DRAWINGS

FIG. 1 is a fragmentary elevational view of the interior of an automobile as viewed from the driver's seat, showing an auxiliary visor in accordance with the present invention attached to the vehicle visor, the vehicle visor being disposed in the downward position, and the auxiliary visor being selectively positioned directly below the vehicle visor (solid lines) and alternately to the right of the vehicle visor (broken lines) or in the storage position (dot-dash lines);

FIG. 2 is a plan view of the vehicle visor equipped with the auxiliary visor as shown in FIG. 1;

DESCRIPTION OF THE PREFERRED EMBODIMENT

Figure 3:
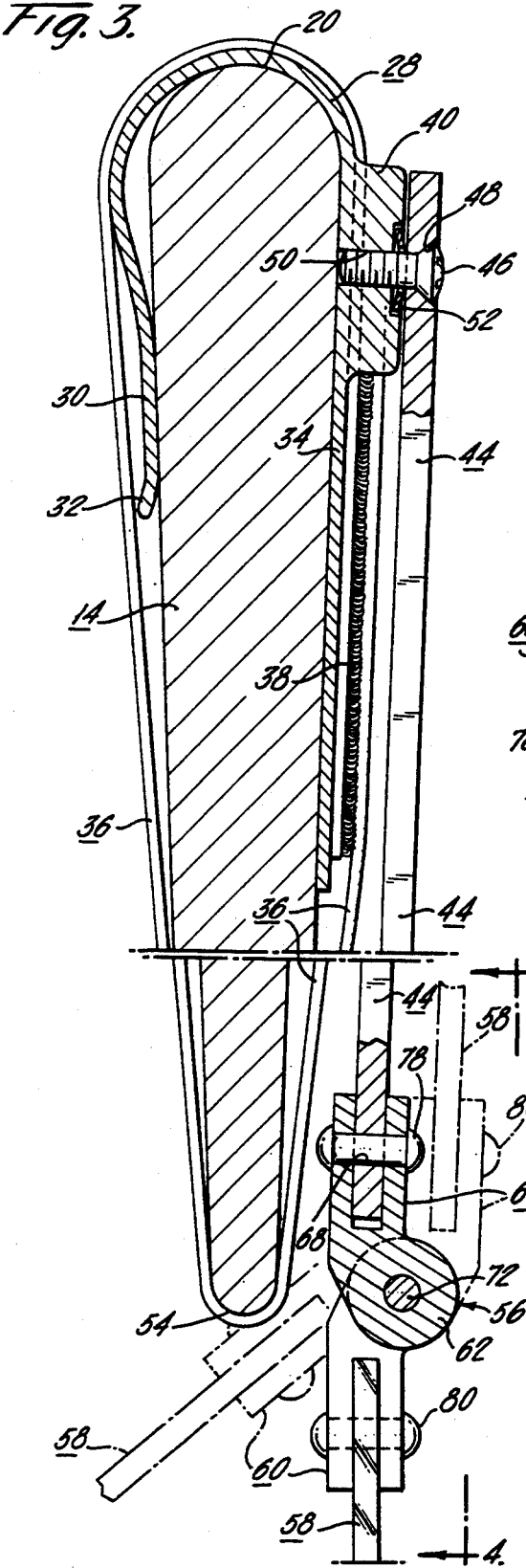
FIG. 3 is a greatly enlarged fragmentary sectional view taken along the line 3—3 of FIG. 1, a central portion of the assembly being removed to permit the showing of the upper and lower areas at a greater scaled.

Referring to the drawings, and particularly FIG. 1 thereof, an automobile interior is shown as viewed from the driver's position and includes a windshield 10, windshield frame 12 and a vehicle visor assembly 14. Also shown is a portion of the vehicle rear view mirror 16.

The vehicle visor assembly 14 is conventional and includes an opaque vehicle visor 18 of an elongated generally rectangular shape which is rotatably supported along one edge 20 by an internal rod 22, a small portion of which is visible at the left upper corner of the vehicle visor where it enters a pocket adjacent the visor edge. The outer end of the rod 22 extends at a right angle to the visor edge 20 and is pivotally connected to the visor support member 24 attached to the windshield frame 12. The visor 18 may accordingly be swung toward or away from the windshield or may be pivoted about the rod 22 to the desired sun or glare blocking position in a well known manner.

As may be seen in FIG. 1, the typical vehicle visor cannot extend horizontally to cover the areas above or below the rear view mirror, otherwise it would cover a portion of the mirror. Furthermore, the vehicle visor is usually of limited depth so that the road ahead will not be obscured by the visor. As a result, road glare cannot usually be reduced for the driver of average height, and drivers of short stature may have difficulty blocking direct sunlight with the typical vehicle visor.

To alleviate these and other sun and glare problems, the present invention provides an auxiliary visor assembly generally designated 26 which as illustrated in FIG. 1 is demountably attached to the vehicle visor 18. The auxiliary visor assembly 26 includes a bracket 28 which may be formed of a plastic or metal extrusion and which in section is of an inverted J shape as shown in FIG. 3, the loop of the J serving to fit over the edge 14 of the vehicle visor. The arcuately shaped portion of the bracket is of sufficient diameter to fit over vehicle visors of different thicknesses, and this portion terminates in a flat portion 30 which bears against the forward face of the vehicle visor when viewed in the position of FIG. 1. To facilitate the mounting of the bracket, the edge 32 adjacent the flat portion 30 is formed outwardly away from the vehicle visor face. The width of the bracket between the flat portion 30 and the opposite planar portion 34 forming the main leg of the J is sized slightly smaller than the average vehicle visor thickness such that some expansion of the bracket is required during mounting. The bracket should have sufficient resilience to permit this expansion and thus provide a spring like grip of the bracket to the vehicle visor.

To supplement the grip thus provided, an adjustable strap 36 is looped vertically around the vehicle visor at a position horizontally central of the bracket. The strap may, for example, be of nylon webbing, and may be adjustably secured by means of hook and loop fasteners on the ends thereof as shown at 38. If desired, the strap could be provided over its length with hook and loop fasteners to facilitate fabrication and to insure a fit with any width vehicle visor. With this arrangement, it can be appreciated that the mounting or removal of the bracket and hence the auxiliary visor assembly can be very quickly accomplished.

As shown in FIGS. 1 and 3, the bracket includes a rib-like portion 40 of increased thickness extending horizontally along the upper end of the bracket portion 34. The portion 40 protrudes away from the vehicle visor and forms a mounting surface for the remaining elements of the auxiliary visor assembly as described below. A slot 42 is provided in the center of the portion 40 to permit passage of the strap 36, thereby preventing the possibility of any horizontal slippage of the bracket with respect to the strap.

A pair of identical arms 44,44 are each pivotally attached to the bracket 28 at their upper ends by screws 46 as shown most clearly in FIG. 3. The screws pass through countersunk holes 48 in the arm ends and into counterbored holes 50 in the portion 40 of the bracket. Spring washers 52 are disposed in the counterbored holes 50 to provide a frictional force to the pivotal arm connection sufficient to hold the arms in any set position. The holes 50 and hence the pivot points of the upper ends of the arms 44,44 are horizontally spaced, being located near the opposite sides of the bracket 28.

The selected length of the arms 44,44 is preferably such as to locate the lower ends of the arms at or near the lower edge 54 of the vehicle visor 18. Pivotally attached to the lower end of each arm is a compound hinge assembly 56 to which in turn is attached a rectangular tinted transparent sheet 58 as best seen in FIG. 1. By means of the compound hinge assemblies, the sheet 58 may be rotated with respect to the arms about a horizontal axis parallel to the sheet in the manner illustrated in broken lines in FIG. 3, and may also be rotated with the arms which are secured to the sheet in parallel relation in the manner shown in FIG. 1. By combining these pivoting motions, the sheet 58 can be positioned in any desired area within the reach of its supporting arms 44,44.

Figure 5:
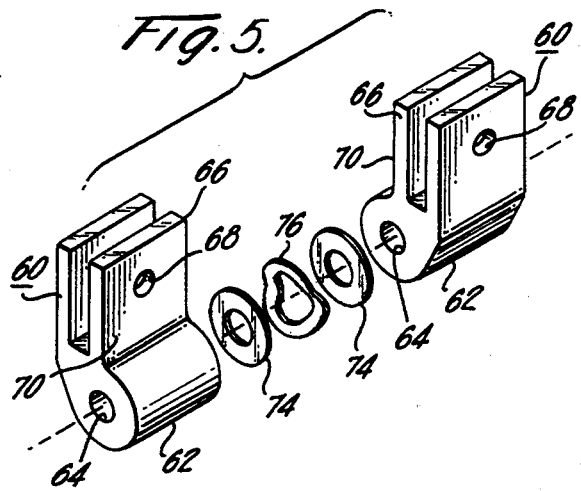
Figure 4:
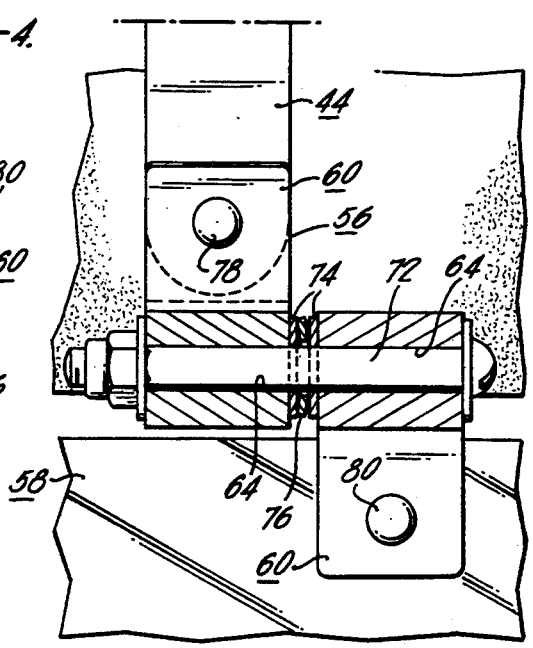
FIG. 4 is a fragmentary elevation view taken along line 4—4 of FIG. 3 showing details of the compound hinge construction; and, FIG. 5 is an exploded isometric view of the compound hinge assembly of FIG. 4.

The details of the compound hinge assemblies 56 are shown in FIGS. 3–5 wherein it can be seen that each hinge assembly 56 includes a pair of identical hinge members 60. Each hinge member 60 includes a generally cylindrical portion 62 having a central bore 64 therein. Extending outwardly from the cylindrical portion 62 is a slotted lug 66 having a transverse hole 68 passing therethrough. The lug 66 is radially offset so that one side 70 thereof lies on a radial plane passing through the center of the cylindrical portion 62 as shown in FIG. 3.

Each compound hinge assembly 56 includes a bolt 72 which passes through the bores 64 of the pair of hinge members 60. As evident from FIGS. 3 and 5, the hinge members are arranged with the lugs 66 thereof oppositely offset to provide a functional advantage to be presently described. Disposed between the hinge members 60 on the bolt 72 are a pair of flat washers 74 flanking a spring washer 76.

Each compound hinge assembly 56 is attached by one hinge member 60 to the lower end of one of the arms 44, and by the other hinge member 60 to the sheet 58. Each arm lower end is inserted in a hinge member lug slot and pivotally fastened thereto by means of a rivet 78 passing through the hole 68 in the lug. Similarly, the sheet edge is inserted in the other hinge member lug slot and fixedly secured thereto by means of a rivet 80. The lower ends of the arms 44 are rounded as shown in broken lines in FIG. 4 to permit rotation of the hinge assembly with respect to the arm about the rivet 78. The bolt 72 is tightened to compress the spring washer 76 sufficiently so as to hold the sheet in any selected rotational position with respect to the arms when rotated about the horizontal axis provided by the bolts 72.

For larger sized auxiliary visors, it may be desirable to add an additional hinge member 60 to each compound hinge assembly 56. The added hinge member 60 would be disposed on the opposite side of the hinge member 60 connected to the arm 44 from that hinge member 60 already illustrated attached to the sheet. The bolt 72 would obviously be of greater length to accommodate the added hinge member. The use of such additional hinge members would spread the weight of the sheet as well as the stress placed on the sheet attach points during repositioning of the auxiliary visor.

For use, the present auxiliary mirror assembly is attached to a vehicle visor in the manner described, the bracket simply being slid over the visor pivot edge, and the strap being adjusted to secure the bracket in place. With the arms in the vertical position shown in FIG. 1, the sheet may be rotated about the bolts 72 to any desired position as illustrated by the arrow in FIG. 3. For maximum protection from road glare, the sheet may be positioned as in solid lines in FIGS. 1 and 3, extending downwardly as an extension of the vehicle visor. To combat sunlight reflecting off of the dashboard, it may be helpful to pivot the screen forwardly toward the windshield. For storage, the screen may be pivoted upwardly against the vehicle visor, and with the vehicle visor swung to its storage position, the auxiliary visor is mostly out of sight, only a portion of the bracket and strap showing.

To extend glare protection to the sides of the vehicle visor or to areas adjacent the corners of the visor, the sheet may be positioned by swinging the arms, for example to the position shown in broken lines in FIG. 1 wherein the sheet closes the gap between the vehicle visor and the rear view mirror and in fact extends behind the mirror to provide some protection both above and below the mirror. Any intermediate position of the sheet between that shown in FIG. 1 in solid lines and that shown in broken lines may be selected to cover desired areas adjacent the corner of the vehicle visor. Although movement of the sheet has be shown and described at the right side of the vehicle visor, it can just as readily be deployed to the left of the vehicle visor at any position obtainable by swinging of the arms 44.

The advantage in making the arms 44 of a length substantially equal to the depth of the vehicle visor can be appreciated by reference to FIG. 3, wherein it can be seen that this relationship permits the forward pivoting of the sheet which otherwise could be contained by the lower edge of the vehicle visor. Also, the benefit realized by the offsetting of the lugs of the hinge elements appears in this same view wherein it can be seen that without this offset, the sheet could not be swung into its uppermost storage position.

The present auxiliary visor may also be usefully employed when the vehicle visor is swung into position parallel with a side window of a vehicle to block sunlight entering from a side angle. The sheet 58 may be utilized adjacent the side window either in a folded down position, extended to one side of the vehicle visor or positioned at any desired intermediate position adjacent a corner of the vehicle visor.

Manifestly, changes in details of construction can be effected by those skilled in the art without departing from the invention.

What is claimed is:

1. An auxiliary motor vehicle visor comprising a bracket, means for attaching said bracket to a generally planar vehicle visor, a pair of arms, each of said arms being pivotally attached at the upper end thereof to said bracket at horizontally spaced points for rotation in a plane parallel to the vehicle visor, a transparent tinted sheet, means for pivotally attaching the lower ends of said arms to an edge of said sheet at spaced points to establish a parallel relation of said arms and permit the selective pivotal movement of said arms and sheet in a plane parallel to said visor, and means connected with said latter means for permitting pivotal movement of said sheet about a horizontal axis parallel to said sheet.

2. The invention as claimed in claim 1, wherein said bracket comprises a generally J-shaped upper portion adapted for placement over an edge of the vehicle visor.

3. The invention as claimed in claim 2, wherein said means for attaching said bracket to the vehicle visor comprises an adjustable strap extending around said visor and passing over said bracket.

4. The invention as claimed in claim 3, wherein said strap is adjustable by means of hook and loop fasteners.

5. An auxiliary motor vehicle visor comprising a bracket, means for attaching said bracket to a generally planar vehicle visor, a pair of arms, each of said arms being pivotally attached at the upper end thereof to said bracket at horizontally spaced points for rotation in a plane parallel to the vehicle visor, a transparent tinted sheet, compound hinge assemblies for pivotally joining the lower ends of said arms to said sheet at spaced points establishing a parallel relation of said arms, said compound hinge assemblies each including a pair of hinge elements, said hinge elements each including a cylindrical portion having a concentric bore therein and a radially offset lug, said hinge elements of each hinge assembly being joined by a bolt passing through the holes of said hinge elements, the lugs of said hinge elements being oppositely offset, one of said lugs being pivotally attached to the lower end of one of said arms, and the other lug being fixedly attached to one edge of said sheet whereby said sheet can be pivoted about said bolts which form a horizontal sheet pivot axis and also by rotation of said parallel arms to extend the sheet toward either side of the vehicle visor.

6. The invention as claimed in claim 5, including means associated with the pivotal mounting of said arms to said bracket and with said compound hinge assemblies for frictionally securing the arms and the sheet in a selected position.

7. The invention as claimed in claim 6, wherein said latter means comprises spring washers.

8. The invention as claimed in claim 5, wherein the length of said arms is such as to locate said bolts adjacent the lower edge of the vehicle visor when the arms are disposed perpendicularly to the visor edge.

9. The invention as claimed in claim 5, wherein said bracket comprises a generally J-shaped upper portion adapted for placement over an edge of the vehicle visor.

10. The invention as claimed in claim 5, wherein said means for attaching said bracket to the vehicle visor comprises an adjustable strap extending around said visor and passing over said bracket.

11. The invention as claimed in claim 10, wherein said strap is adjustable by means of hook and loop fasteners.

* * * * *